United States Patent [19]

Okada et al.

[11] Patent Number: 5,642,244

[45] Date of Patent: Jun. 24, 1997

[54] METHOD AND APPARATUS FOR SWITCHING BETWEEN DATA AND SERVO MODES

[75] Inventors: Paul Okada, Westminster; Tim Jackson, Yorba Linda; Kirby Lam, Margarita; Richard Contreras, Loguna Beach, all of Calif.

[73] Assignee: Texas Instruments Incorporated, Dallas, Tex.

[21] Appl. No.: 271,866

[22] Filed: Jul. 7, 1994

Related U.S. Application Data

[62] Division of Ser. No. 13,005, Feb. 3, 1993, abandoned.

[51] Int. Cl.[6] ............................... G11B 15/12; G11B 5/09
[52] U.S. Cl. ............................................ 360/61; 360/46
[58] Field of Search ...................... 360/32, 46, 48, 360/51, 61, 77.08, 65

[56] References Cited

U.S. PATENT DOCUMENTS

| | | | |
|---|---|---|---|
| 4,535,371 | 8/1985 | Harr et al. | 360/67 |
| 5,303,095 | 4/1994 | Vuong | 360/46 |
| 5,319,508 | 6/1994 | Tsunoda et al. | 360/46 |
| 5,327,302 | 7/1994 | Khoury et al. | 360/51 |
| 5,345,342 | 9/1994 | Abbott et al. | 360/48 |
| 5,463,603 | 10/1995 | Petersen | 360/67 X |

*Primary Examiner*—W. C. Kim
*Attorney, Agent, or Firm*—W. Daniel Swayze, Jr.; W. James Brady, III; Richard L. Donaldson

[57] ABSTRACT

A servo gate method and apparatus to allow switching between a servo mode and a data mode in the read channel of a disk drive. The present invention uses a servo gate signal to select components and parameters in the read channel of a disk drive. The servo gate signal, when enabled, preloads appropriate registers with new values and preloads the programmable filter with new values. The servo gate signal is not limited to preloading the above values, but may be used to control many characteristics of a disk drive read channel. For example, the servo gate signal may be used to control a pulse detector amplitude voltage threshold, to select between a window comparator and a hysteresis comparator, to control a pulse detector qualification mode for either a window comparator or a hysteresis comparator, to set a hysteresis threshold time constant, to adjust the cut-off frequency and high-frequency boost of a programmable filter, to switch a raw data output, to set an AGC amplifier gain setting, to provide fast recovery from changes in offset or DC operating point changes and to set an AGC amplifier target voltage level. The servo gate signal is designed to override read gate and write gate signals.

12 Claims, 6 Drawing Sheets

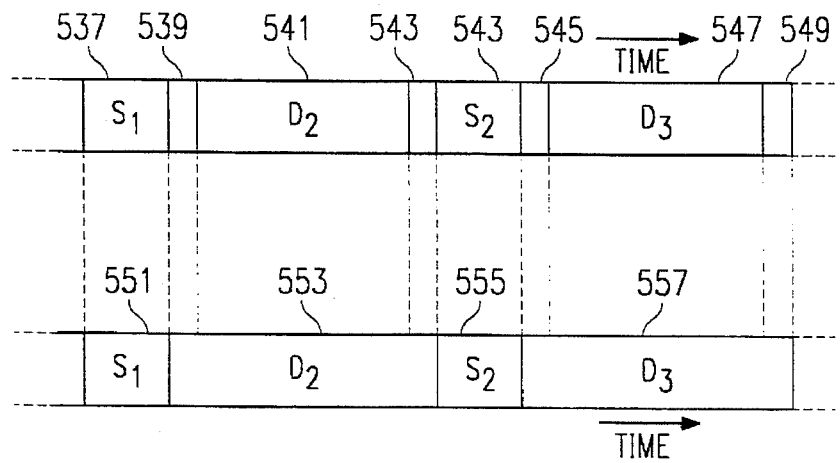
*FIG. 5A (PRIOR ART)*
*FIG. 5B*
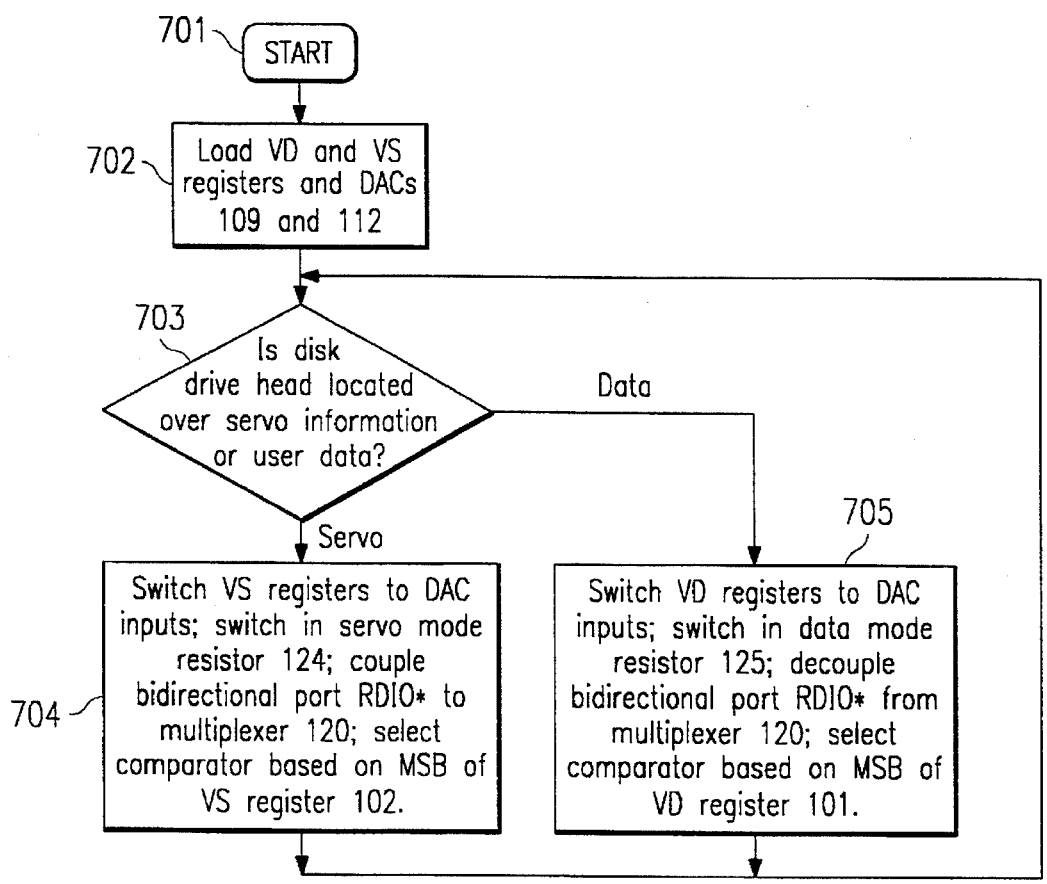
*FIG. 7*

5,642,244

METHOD AND APPARATUS FOR SWITCHING BETWEEN DATA AND SERVO MODES

This is a division of application Ser. No. 08/013,005 filed Feb. 3, 1993 abandoned.

BACKGROUND OF THE INVENTION

1. Field of the Invention

The present invention relates to disk drives and, in particular, to switching between servo and data modes in the read channel of a disk drive.

2. Background Art

Computers often use disk drives to store information. Disk drives typically include one or more circular disks having at least one ferromagnetic surface. A read and write head assembly is positioned in proximity to the surfaces of the disk. A read/write head receives information to be stored from the computer and alters the magnetic orientation of a portion of the ferromagnetic surface. The read/write head detects the orientation of the portion of the ferromagnetic surface and provides an output signal to the computer. Thus, information from the computer may be stored to disk, and information from the disk may be retrieved and provided to the computer.

To allow recovery of data from a disk, the head assembly must be precisely positioned over the portion of the surface of the disk where the desired data is located. Several methods exist for controlling head position. One method is referred to as dedicated servo. One disk surface is dedicated as a servo surface and another disk surface is dedicated as a data surface. Head positioning control information is recorded on the servo surface, while user data is recorded on the data surface. This method has several disadvantages. First, this method requires multiple disk surfaces (usually multiple disks), which results in a large disk drive structure that can be too cumbersome for many applications. Second, this method is intolerant of any misalignment between the heads associated with the servo disk surface and the heads associated with the data disk surface.

FIG. 3 illustrates another method, referred to as sector servo, which involves the placement of servo information and user data on the same disk surface. The surface of the disk is divided into regions for storing the servo information and regions for storing the user data. Regions $S_1$–$S_8$ are used for storing servo information. Regions $D_1$–$D_8$ are used for storing user data. The servo information and user data often have different recording characteristics. Thus, the read circuitry usually must adjust from reading servo information to reading a user data and from reading user data to reading servo information. This adjustment takes time. Since the disk is rotating past head 301, which is mounted on actuator arm 302, during the transition time, some angular amount of disk space will pass under the head assembly during the transition. Examples of the disk space passed during mode transition are shown by angular gaps 303 and 304 of FIG. 3. The disk is neither fully in data mode nor fully in servo mode during this time, so the disk space crossed during the transition may not be used for storing either servo information nor user data. Thus, some of the disk space is unusable for data storage.

Since the disk is rotating past head 301, the signals derived from head 301 over time will be based on information read from the disk as it passes under head 301. FIG. 5A illustrates the signals derived from head 301. Signals from servo sector $S_1$ are read during time period 501. Time period 502 represents a delay required for the prior art read channel to switch from servo mode to data mode. Signals from data sector $D_2$ are read during time period 503. Time period 504 represents a delay required for the prior art read channel to switch from data mode to servo mode. Signals from servo sector $S_2$ are read during time period 505. Time period 506 represents a delay required for the prior art read channel to switch from servo mode to data mode. Signals from data sector $D_3$ are read during time period 507. Time period 508 represents a delay required for the prior art read channel to switch from data mode to servo mode.

SUMMARY OF THE INVENTION

The present invention provides a servo gate method and apparatus to allow switching between a servo mode and a data mode in the read channel of a disk drive.

The present invention may be practiced with a sector servo system, where the information on the surface of the disk includes servo information interspersed with user data. The present invention allows very rapid switching between servo mode and data mode, greatly reducing the amount of disk space crossed during mode transitions. Thus, the present invention allows more efficient use of disk space and avoids the large amount of unused disk space associated with prior art sector servo systems.

The present invention uses a servo gate signal to select components and parameters in the read channel of a disk drive. First, appropriate values are preloaded into two or more registers. Then, the servo gate signal, when enabled, selects appropriate registers and selects appropriate parameters for the programmable filter. The servo gate signal is not limited to selecting of the above values and parameters, but may be used to control many characteristics of a disk drive read channel. For example, the servo gate signal may be used to control a pulse detector amplitude voltage threshold, to select between a window comparator and a hysteresis comparator, to control a pulse detector qualification mode for either a window comparator or a hysteresis comparator, to set a hysteresis threshold time constant, to adjust the cut-off frequency and high-frequency boost of a programmable filter, to switch a raw data output, to set an AGC amplifier gain setting, to provide fast recovery from changes in offset or DC operating point changes and to set an AGC amplifier target voltage level.

The servo gate signal is designed to override read gate and write gate signals. Both the read gate and write gate signals should be inactive during the time the servo gate signal is active. If the servo gate signal is asserted, any assertion of the read gate and write gate signals should be ignored. Preferably, logic gates are provided to disable the read gate and write gate signals upon assertion of the servo gate signal.

BRIEF DESCRIPTION OF THE DRAWINGS

FIG. 5A is a diagram of signals derived from a prior art sector servo system.

FIG. 5B is a diagram of signals derived from a sector servo system of the present invention.

FIG. 7 is a flowchart illustrating the steps of the preferred embodiment of the present invention.

DETAILED DESCRIPTION OF THE INVENTION

A method and apparatus to allow switching between a servo mode and a data mode in the read channel of a disk drive is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In prior art sector servo systems, new values for parameters had to be loaded whenever a switch from servo mode to data mode or from data mode to servo mode occurred. The new values had to be transmitted over a medium such as a serial line. The loading of new values decreased the amount of user data that could be stored on a disk drive. Therefore, there has been a need for a method of quickly and efficiently switching between the data mode and the servo mode.

The present invention provides a servo gate signal to select components and parameters appropriate to the selected mode without the delay associated with the prior art methods. The present invention uses the servo gate signal to switch between registers that have been preloaded with values appropriate for the selected mode. The present invention also selects between circuit elements having characteristics appropriate for the selected mode.

Figure 4:
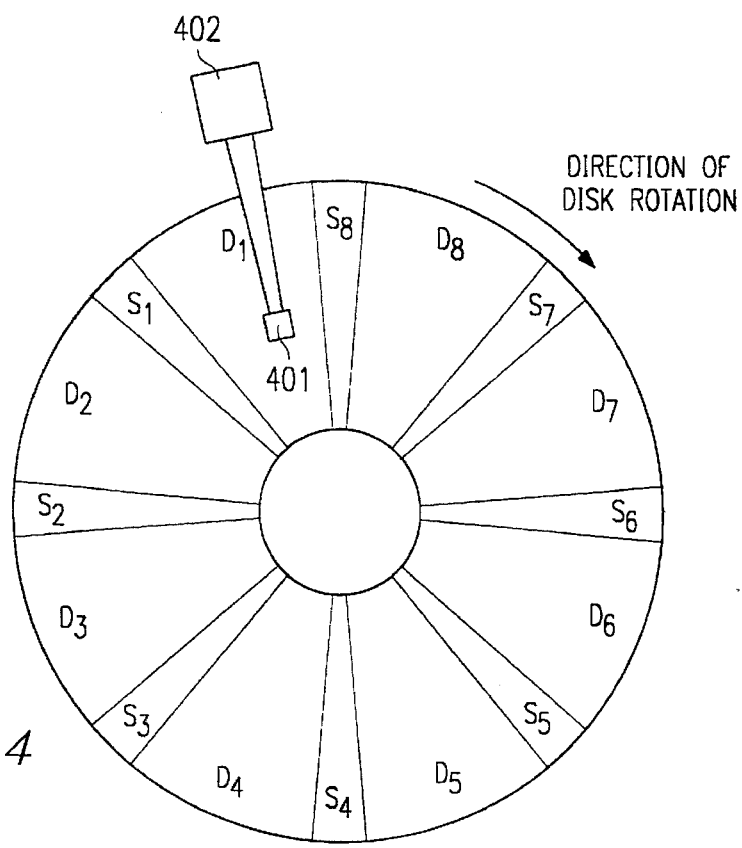
FIG. 4 is a diagram of a sector servo system of the present invention.

FIG. 4 illustrates the sector servo system provided by the present invention. A disk containing data sectors $D_1$–$D_8$ and servo sectors $S_1$–$S_8$ is rotated past head 401, which is mounted on actuator arm 402. As the servo sectors and data sectors pass sequentially under head 401, head 401 produces a signal over time as illustrated in FIG. 5B. Signals from servo sector $S_1$ are read during time period 551. Signals from data sector $D_2$ are read during time period 553. Signals from servo sector $S_2$ are read during time period 555. Signals from data sector $D_3$ are read during time period 557. Since the present invention allows rapid transition between servo mode and data mode, the gaps of the prior art between the servo sector signals and the data sector signals are virtually eliminated by the present invention.

FIG. 1

Figure 1A:
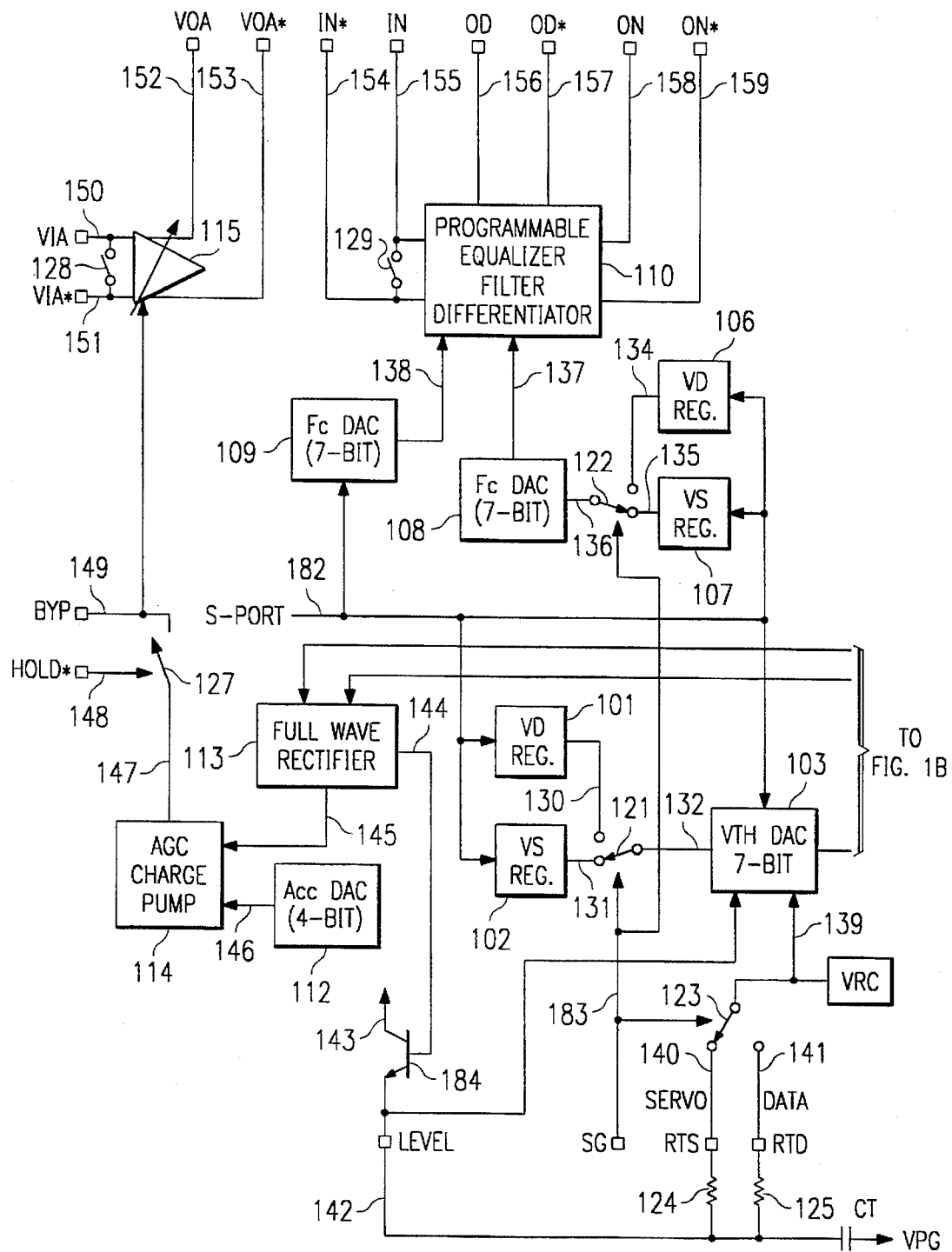
FIG. 1 is a block diagram illustrating the preferred embodiment of the present invention.
Figure 1B:
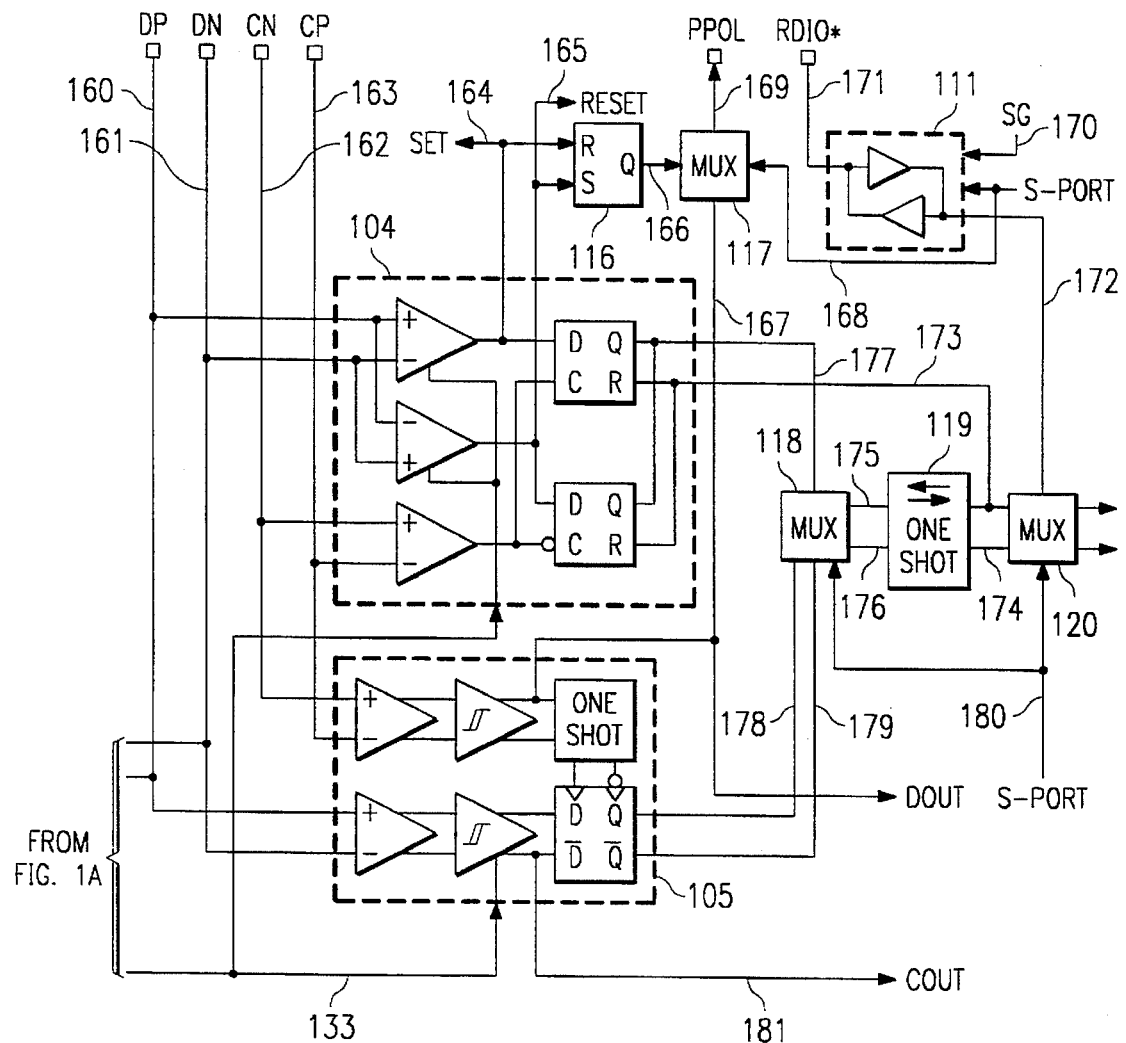

FIG. 1 illustrates a block diagram of the preferred embodiment of the present invention. FIG. 1 includes VD register 101, VS register 102, 7-bit VTH DAC 103, window comparator 104, hysteresis comparator 105, VD register 106, VS register 107, 7-bit Fc DAC 108, 7-bit Fa DAC 109, programmable equalizer filter and differentiator 110, transmission gate 111, 4-bit AGC DAC 112, full wave rectifier 113, AGC charge pump 114, AGC amplifier 115, R-S flip-flop 116, multiplexer 117, multiplexer 118, bidirectional one-shot 119, multiplexer 120, switches 121, 122, 123, 127, 128 and 129, resistors 124 and 125, capacitor 126, inputs VIA, VIA*, HOLD*, SG, IN, IN*, DP, DN, CP, CN, SET, RESET and S-PORT, outputs VOA, VOA*, OD, OD*, ON, ON*, PPOL, DOUT and COUT, bidirectional port RDIO*, pins BYP, LEVEL, RTS and RTD, nodes 130–183, node VPG and transistor 184.

Input S-PORT is coupled to nodes 168, which is coupled to transmission gate 111 and to multiplexer 117. Input S-PORT is also coupled to node 180, which is coupled to multiplexers 118 and 120. Input S-PORT is further coupled to node 182, which is coupled to 7-bit Fa DAC 109, VD register 101, VS register 102, VD register 106, VS register 107 and 7-bit VTH DAC 103. Input SG is coupled to node 183, which is coupled to the control terminal of each of switches 121, 122 and 123. Input SG is also coupled to node 170, which is coupled to transmission gate 111. Input VIA is coupled to node 150, which is also coupled to a first terminal of switch 128 and to an input of AGC amplifier 115. Input VIA* is coupled to node 151, which is also coupled to a second terminal of switch 128 and to another input of AGC amplifier 115. AGC amplifier 115 provides an output signal at node 152, which is coupled to output VOA. AGC amplifier 115 also provides an output signal to node 153, which is coupled to output VOA*.

Input IN is coupled to node 155, which is also coupled to a first terminal of switch 129 and to an input of programmable equalizer, filter and differentiator 110. Input IN* is coupled to node 154, which is coupled to a second terminal of switch 129 and to another input of programmable equalizer, filter and differentiator 110. Programmable equalizer, filter and differentiator 110 produces an output signal at node 156, which is coupled to output OD. Programmable equalizer, filter and differentiator 110 produces an output signal at node 157, which is coupled to output OD*. Programmable equalizer, filter and differentiator 110 also produces an output at node 158, which is coupled to output ON. Programmable equalizer, filter and differentiator 110 is further coupled to node 159, which is coupled to output ON*.

Input DP is coupled to node 160, which is coupled to an input of each of full wave rectifier 113, window comparator 104 and hysteresis comparator 105. Input DN is coupled to node 161, which is coupled to an input of each of full wave rectifier 113, window comparator 104 and hysteresis comparator 105. Input CN is coupled to node 162, which is coupled to an input of each of window comparator 104 and hysteresis comparator 105. Input CP is coupled to node 163, which is coupled to an input of each of window comparator 104 and hysteresis comparator 105. Full wave rectifier 113 produces an output signal at node 145, which is coupled to AGC charge pump 114. Four-bit AGC DAC 112 produces an output signal at node 146, which is coupled to AGC charge pump 114. AGC charge pump 114 is coupled to node 147, which is coupled to a first terminal of switch 127. A second terminal of switch 127 is coupled to node 149, which is coupled to pin BYP and to a control input of AGC amplifier 115. A first terminal of an external capacitor is coupled to pin BYP. A second terminal of an external capacitor is coupled to a fixed DC voltage, preferably a power supply voltage or ground. Pin HOLD* is coupled to node 148, which is coupled to a control terminal of switch 127.

Input SET is coupled to window comparator 104 and to a reset input of SR flip-flop 116. Input RESET is coupled to window comparator 104 and to a set input of SR flip-flop 116. A Q output of SR flip-flop 116 is coupled to node 166, which is coupled to multiplexer 117. Multiplexer 117 is also coupled to node 167, which is coupled to hysteresis comparator 105 and to output DOUT. Multiplexer 117 is also coupled to node 169, which is coupled to output PPOL.

Window comparator 104 is coupled to node 1.77, which is coupled to multiplexer 118. Window comparator 104 is also coupled to node 173, which is coupled to bidirectional one-shot 119 and to multiplexer 120. Hysteresis comparator 105 is coupled to node 178, which is coupled to multiplexer 118. Hysteresis comparator 105 is also coupled to node 179, which is coupled to multiplexer 118. Multiplexer 118 is coupled to bidirectional one-shot 119 through nodes 175 and 176. Bidirectional one-shot 119 is coupled to multiplexer 120 through node 174. Multiplexer 120 is coupled to node 172, which is coupled 1o transmission gate 111. Transmission gate 111 is coupled to bidirectional port RDIO* through node 171.

Hysteresis comparator 105 is coupled to node 181, which is coupled to output 105. Full wave rectifier 113 is coupled to node 144, which is coupled to the base of transistor 184. The collector of transistor 143 is coupled to a fixed DC voltage, preferably a positive supply voltage. The emitter of transistor 184 is coupled to 7-bit VTH DAC 103 and through pin LEVEL to node 142, which is coupled to a first terminal of each of resistor 124, resistor 125 and capacitor 126. The second terminal of capacitor 126 is coupled to node VPG, which is held at a fixed DC voltage, preferably a positive supply voltage. The second terminal of resistor 124 is coupled through pin RTS to node 140, which is coupled to a first terminal of switch 123. The second terminal of resistor 125 is coupled through pin RTD to node 141, which is coupled to a second terminal of switch 123. A common terminal of switch 123 is coupled to node 139, which is coupled to 7-bit VTH DAC 103.

VD register 101 is coppied to node 130, which is coupled to a first terminal of switch 121. VS register 102 is coupled to node 131, which is coupled to a second terminal of switch 121. A common terminal of switch 121 is coupled to node 132, which is coupled to 7-bit VTH DAC 103. Seven-bit VTH DAC 103 is coupled to node 133, which is coupled to window comparator 104 and hysteresis comparator 105. Seven-bit Fa DAC 109 is coupled to node 138, which is coupled to programmable equalizer, filter and differentiator 110. VD register 106 is coupled to node 134, which is coupled to a first terminal of switch 122. VS register 107 is coupled o node 135, which is coupled to a second terminal of switch 122. A common terminal of switch 122 is coupled to 7-bit Fc DAC 108. Seven-bit Fc DAC 108 is coupled to node 137, which is coupled to programmable equalizer, filter and differentiator 110.

Input S-PORT

Input S-PORT represents a serial port input. The serial port input is used to supply new parameter values and configuration settings to VD register 101, VS register 102, VD register 106, VS register 107, 7-bit Fa DAC 109, 7-bit Fc DAC 108, multiplexers 117, 118, 120 and transmission gate 111. Input S-PORT loads VD register 101 and VD register 106 with parameter values suitable for operation of the system in its data mode. Input S-PORT loads VS register 102 and VS register 107 with parameter values suitable for operation of the system in its servo mode.

Input SG

Since servo areas are interspersed with data areas on the surface of the disk, signals derived from a read head located over the disk alternate between servo signals and data signals. When servo signals are detected, the servo gate signal at the SG input goes low to its active state. The SG signal is applied to switch 121, causing switch 121 to couple node 131 to node 132, leaving node 130 open. VS register 102 is coupled to 7-bit VTH DAC 103 via switch 121, and the seven least significant bits (7 LSBs) of the value stored in VS register 102 are loaded into 7-bit VTH DAC 103. Seven-bit VTH DAC 103 produces a analog output that is supplied to window comparator 104 and hysteresis comparator 105 to set the comparison levels or hysteresis value of the comparators. The most significant bit (MSB) of VS register 102 is coupled multiplexers 118 and 120 and is used to select between window comparator 104 and hysteresis comparator 105 in the servo mode. If the MSB is 1, the window comparator 104 is selected. If the MSB is 0, the hysteresis comparator 105 is selected. The window comparator is usually preferred for the servo mode.

When data signals are detected, the servo gate signal at input SG goes to its inactive state. The SG signal is applied to switch 121, causing switch 121 to couple node 130 to node 132, leaving node 131 open. VD register 101 is coupled to 7-bit VTH DAC 103, and the seven LSBs of the values stored in VD register 101 are loaded into 7-bit VTH DAC 103. Seven-bit VTH DAC 103 produces a analog output that is supplied to window comparator 104 and hysteresis comparator 105 to set the comparison levels or hysteresis value of the comparators. The most significant bit (MSB) of VD register 101 is coupled to multiplexers 118 and 120 and is used to select between window comparator 104 and hysteresis comparator 105 in the data mode. If the MSB is 1, the dual-level window comparator 104 is selected. If the MSB is 0, the hysteresis comparator 105 is selected. The hysteresis comparator is usually preferred for the data mode.

The servo gate signal from the SG input, which is responsive to changes between data and servo modes, is also coupled to switch 122. When the SG signal is in its active state, switch 122 couples node 135 to node 136, leaving node 134 open. VS register 107 loads the 7 LSBs of the value stored in it through switch 122 into 7-bit Fc DAC 108. Seven-bit Fc DAC 108 produces an analog signal through node 137 to set the cutoff frequency of programmable equalizer, filter and differentiator 110. Since servo signals are typically of lower frequency than data signals, a lower cut-off frequency is usually preferred during servo mode operation. A lower cut-off frequency reduces high frequency noise and improves the signal-to-noise ratio in the servo mode.

When the SG signal is in its inactive state, switch 122 couples node 134 to node 136, leaving node 135 open. VD register 106 loads the 7 LSBs of the value stored in it through switch 122 into 7-bit Fc DAC 108. The 7 LSBs determine the cut-off frequency of 7-bit Fc DAC 108. Since data signals are typically of higher frequency than the servo signals, a higher cut-off frequency is usually preferred during data mode operation.

Seven-bit Fa DAC 109 is also responsive to switching between servo and data modes. Seven-bit Fa DAC 109 provides an analog signal to control the high-frequency boost of programmable equalizer, filter and differentiator 110. Since servo signals are typically of a lower frequency than data signals, the high-frequency boost is not needed during operation in the servo mode. In the servo mode, high-frequency boost and other equalization functions are disabled to increase the signal-to-noise ratio. In the data mode, 7-bit Fa DAC provides an analog signal based on a value loaded through serial port input S-PORT. The analog signal determines the amount of high-frequency boost that is to be applied to the signals passing through programmable equalizer, filter and differentiator 110.

Four-bit AGC DAC 112 is also responsive to switching between the servo and data modes. When in the servo mode, 4-bit AGC DAC 112 provides an analog signal based on a programmable four-bit digital input of 4-bit AGC DAC 112 to AGC charge pump 114 through node 146. The four-bit digital input can be programmed to match the operation of AGC charge pump 114 to the characteristics of the data signals being processed. The gain of AGC amplifier 115 can be adjusted to provide data signals having a desired amplitude. In the data mode, the AGC target voltage is fixed at one volt peak to peak. Constant gain and a predictable target voltage of AGC amplifier 115 is desirable for processing of servo signals.

The servo gate signal from input SG is also applied to the control terminal of switch 123. When the SG signal is active, switch 123 couples node 139 to node 140, leaving node 141 open. Seven-bit VTH DAC 103 is coupled to external resistor 124 through node 142, switch 123, node 140 and pin RTS. Resistor 124 is used to control the hysteresis threshold time constant of hysteresis comparator 105 when in the servo mode. When the SG signal is inactive, switch 123 couples node 139 to node 141, leaving node 140 open. Seven-bit VTH DAC 103 is coupled to external resistor 125 through node 142, switch 123, node 141 and pin RTD. Resistor 125 is used to control the hysteresis threshold time constant of hysteresis comparator 105 when in the data mode. Alternatively, switch 123 may select between two internal current sources, one for data mode and one for servo mode, instead of selecting between two external resistors.

The servo gate signal from input SG is also coupled to transmission gate 111. Transmission gate 111 is a selectable bidirectional buffer for allowing bidirectional data flow. In the servo mode, the SG signal is active and transmission gate 111 allows TTL raw data output pulses to be transmitted through bidirectional port RDIO*. In the data mode, the SG signal is inactive and transmission gate 111 blocks the transmission of TTL raw data output pulses through bidirectional port RDIO*. It is desirable to block the transmission of the TTL pulses during the data mode to reduce electrical noise from the circuit.

Figure 2:
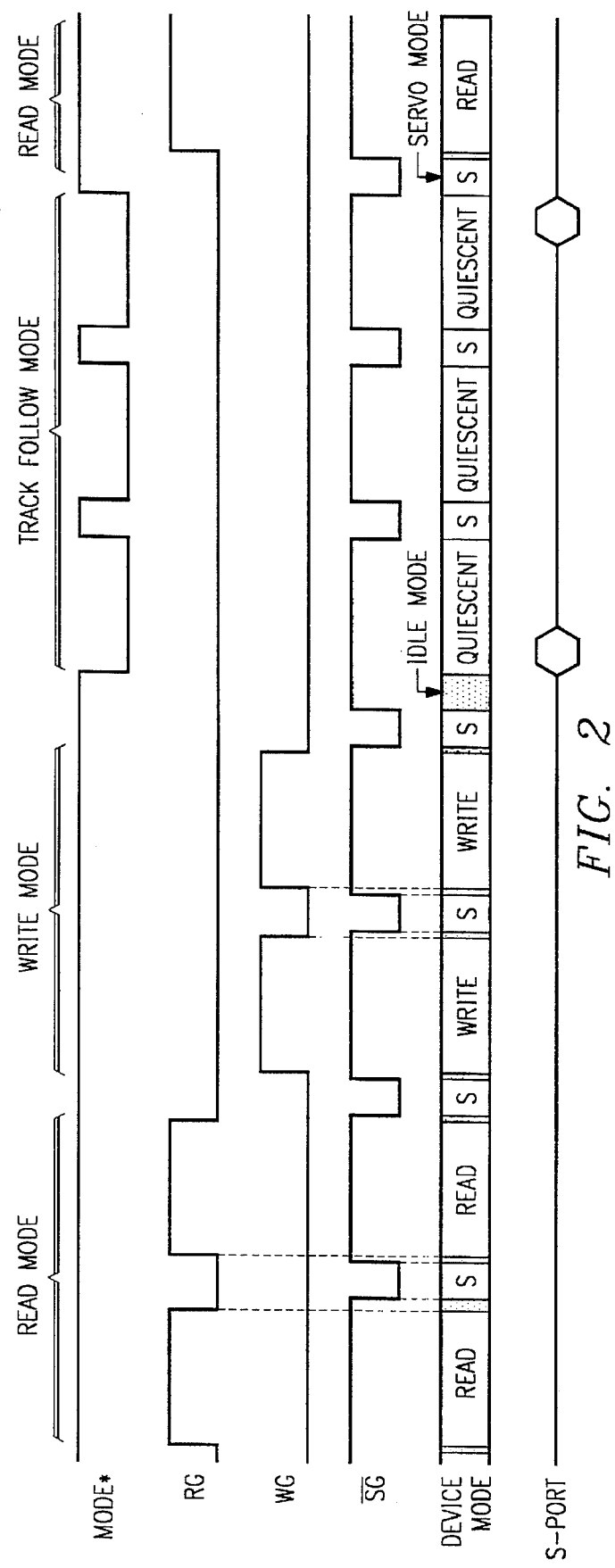
FIG. 2 is a timing diagram illustrating the signals of the preferred embodiment of the present invention.
Figure 3:
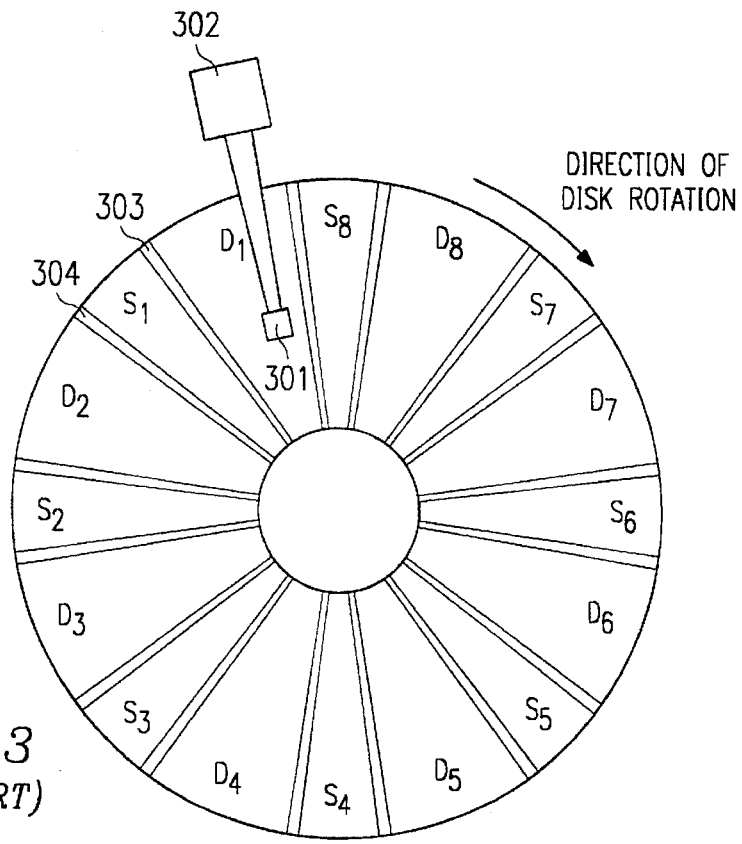
FIG. 3 is a diagram of a prior art sector servo system.

FIG. 2 is a timing diagram illustrating the operation of the preferred embodiment of the present invention. FIG. 2 illustrates four sequentially occurring modes of operation. On the left side of FIG. 2, the read mode is illustrated. To the right of the read mode, the write mode is illustrated. To the right of the write mode, the track follow mode is illustrated. To the right of the track follow mode, another example of the read mode is illustrated. FIG. 2 illustrates the status of the signals MODE*, RG, WG, $\overline{SG}$ and S-PORT and the mode in which the system is operating; denoted DEVICE MODE.

The signal MODE* is used to select active and quiescent modes of the system blocks. A power down control register controls power management within the system. If the signal MODE* is high (logical one), the power down control register is active. All blocks that have their control bit set to a logical one are powered down. If the signal MODE* is low (logical zero), the system is placed in a quiescent, or sleep, mode with all blocks powered down except the serial port.

In the read mode, the MODE* signal is held high to keep the system blocks active. The RG (read gate) signal goes high during the portion of the read mode when valid data is being read, but goes low when servo information is being read. The WG (write gate) signal is held low during the read mode since data is being read, not written. The $\overline{SG}$ signal, which is active low, remains high during the portion of the read mode during which valid data is being read, but goes low when servo information is being read. The transitions of RG and $\overline{SG}$ need not be precisely synchronized. A brief delay often occurs in the detection of servo and data modes without adversely affecting the performance of the system. When RG and WG are low and $\overline{SG}$ is high, the system will enter an idle mode.

In the write mode, the MODE* signal is held high to keep the system in the active state. The RG signal is held low since data is being written, not read. The WG signal goes high during the portions of the write mode during which data is being written to the disk. The WG signal goes low during the portions of the write mode during which servo information is being processed. The $\overline{SG}$ signal goes high during those portions of the write mode during which data is being written to the disk. The $\overline{SG}$ signal goes low during those portions of the write mode during which servo information is being processed. The transitions of the WG signal need not be precisely aligned with the transitions of the $\overline{SG}$ signal. It may be desirable to allow a brief delay between the data mode and the servo mode to avoid overwriting the servo information with data.

In the track follow mode, the signal MODE* is brought low except during servo mode operations, when it is brought high. The RG signal is held low since no data is being read from the disk. The WG signal is held low since no data is being written to the disk. Since both the RG and WG signal are low simultaneously, the system remains in an idle mode. The $\overline{SG}$ signal remains high except during servo mode operations, when it goes low. When the signal MODE* is low, the system is placed in a quiescent (powered down or sleep) mode, where no reading or writing takes place and power consumption is minimized. The transitions of the MODE* and $\overline{SG}$ signals should be closely synchronized to maximize the amount of time in the quiescent state and to minimize power consumption. However, the present invention may also be practiced without close synchronization of the MODE* and $\overline{SG}$ signals.

It is preferable to hold the signal S-PORT at a fixed level for the duration of the read and write modes. Serial data should be transmitted via the S-PORT signal during the quiescent state.

Figure 6:
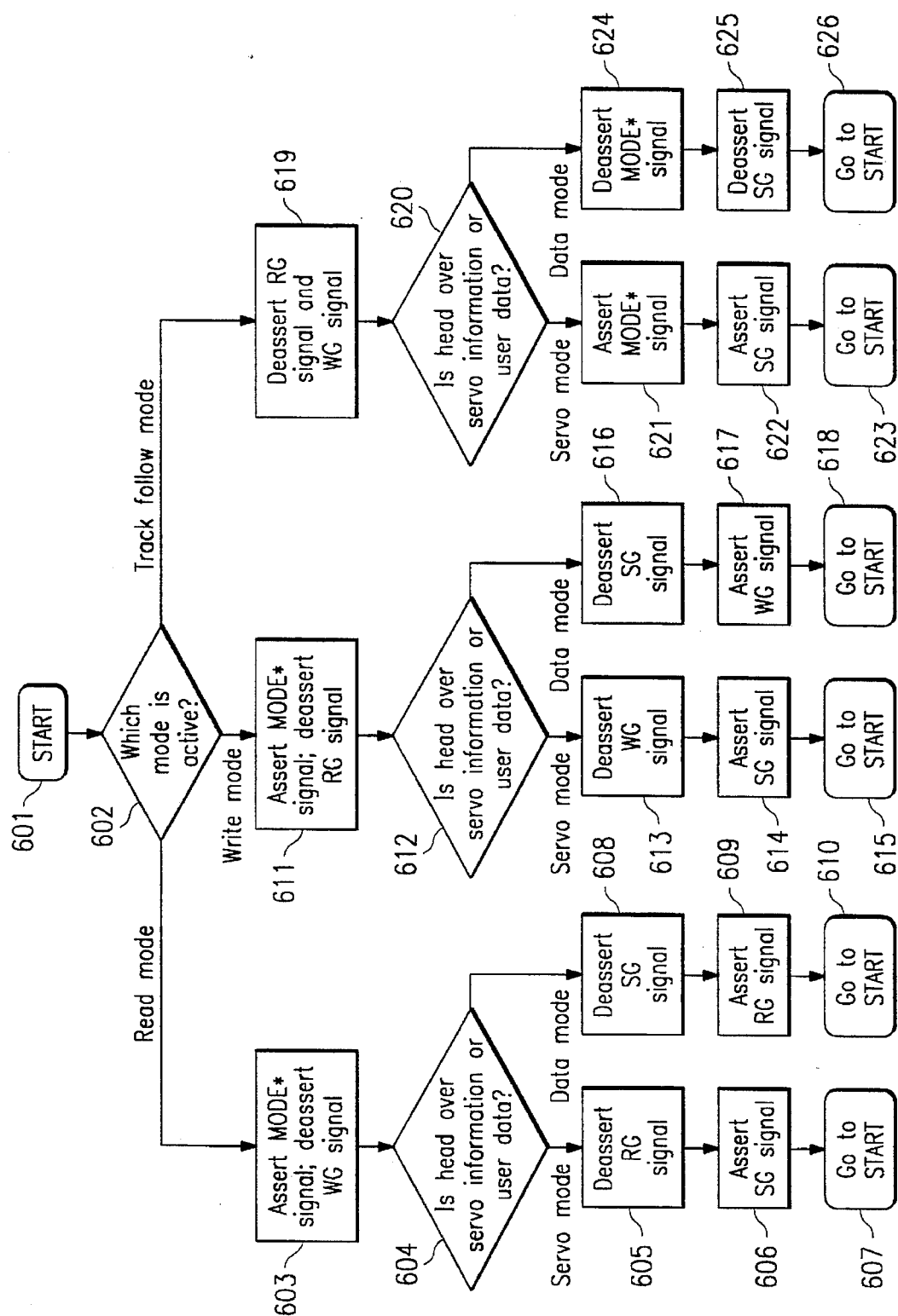
FIG. 6 is a flowchart illustrating the steps of one embodiment of the present invention.

The flowchart of FIG. 6 illustrates the steps of one embodiment of the present invention. Beginning at the START block 601, the next step is to determine the node in which the sector servo system is currently operating, which is performed at decision block 602. This embodiment of the present invention provides for operation in a read mode, a write mode or a track follow mode. If the system is in the read mode, the next step is to assert the MODE* signal and deassert the WG signal in block 603. Then, a determination is made as to whether the disk drive head is passing over a region containing servo information or one containing user data. This determination is made in decision block 604. If the head is passing over a region of servo information, the next step is to deassert the RG signal in block 605. Then, the SG signal is asserted in block 606. Then, a jump is made from block 607 back to START block 601, allowing operation to continue over time.

If, instead of passing over servo information, the disk drive heads are passing over user data, the next step after decision block 604 is to deassert the SG signal in block 608. Then, the RG signal is asserted in block 609. Then, a jump is made from block 610 back to START block 601, allowing operation to continue.

If instead of being in the read mode, the system is in the write mode, the next step after decision block 602 is to assert the MODE* signal and to deassert the RG signal in block 611. Then, in decision block 612, a determination is made as to whether the disk drive head is located over a portion of the disk surface containing servo information or one containing user data. If the head is located over servo information, the next step is to deassert the WG signal in block 613. Then, the SG signal is asserted in block 614. Then, a jump is made from block 615 back to START block 601, allowing operation to continue.

If instead of being located over servo information, the head is located over user data, the next step from decision block 612 is to deassert the SG signal in block 616. Then, the WG signal is asserted in block 617. Then, a jump is made from block 618 back to START block 601.

If, instead of being in either the read mode or the write mode, the system is in the track follow mode, the next step after decision block 602 is to deassert the R,G and WG signals in block 619. Then, a determination is made in decision block 620 as to whether the head is located over a portion of the disk surface containing servo information or one containing user data. If the head is located over servo information, the next step after decision block 620 is to assert the MODE* signal in block 621. Then, the SG signal is asserted in block 622. Then, a jump is made from block 623 back to START block 601.

If, however, the head is not located over servo information, but is located over user data, the next step after decision block 620 is to deassert the MODE* signal in block 624. Then, the SG signal is deasserted in block 625. Then, a jump is made from block 626 back to START block 601.

The flowchart of FIG. 7 illustrates the steps of the preferred embodiment of the present invention. Beginning with START block 701, the next step is to load VD and VS registers and DACs 109 and 112 with the desired values in block 702. Then, a determination is made in decision block 703 as to whether the disk drive head is located over a portion of the disk surface containing servo information or over a portion containing user data. If the head is located over a portion containing servo information, the VS registers are coupled to the DAC inputs using switches, servo mode resistor 124 is selected using a switch, bidirectional port RDIO* is coupled to multiplexer 120 and a comparator is selected based on the MSB of VS register 102 in block 704. Then, a jump is made from block 704 back to decision block 703, and the process continues as described above.

If, however, the head is not located over servo information, but over user data, the next step after decision block 703 is to couple the VD registers to the DAC inputs using switches, to select data mode resistor 125 using a switch, to decouple bidirectional port RDIO* from multiplexer 120 and to select the appropriate comparator based on the MSB of VD register 101 in block 705. Then, a jump is made from block 705 back to decision block 703, and the process continues as described above.

By providing an SG (SG) signal to allow the rapid switching of preloaded values for providing rapid transition between data and servo modes, a system has been provided that maximizes usable disk space and the data transfer rate.

We claim:

1. A method for switching between a data mode and a servo mode in a disk drive comprising the steps of:

reading recorded signals from a disk;

sensing a transition from stored data to servo information;

generating a servo gate signal;

selecting a data register if said servo gate signal is in a first state, and selecting a servo register if said servo gate signal is in a second state.

2. The method of claim 1 further comprising the steps of:

selecting a data resistor if said servo gate signal is in said first state, and selecting a servo resistor if said servo gate signal is in said second state;

setting an analog value of a read circuit of said disk drive according to resistance values of said data resistor and said servo resistor.

3. The method of claim 2 further comprising the steps of:

enabling a transmission gate if said servo gate signal is in said first state, and disabling said transmission gate if said servo gate signal is in said second state.

4. A disk drive read channel comprising:

mode selection means for selectively enabling and controlling components in response to a signal indicating a transition between a servo mode and a data mode, said components comprising:

an AGC circuit coupled to said mode selection means for amplifying a first signal;

a data register coupled to said mode selection means;

a servo register coupled to said mode selection means;

a filter coupled to said mode selection means for filtering a second signal;

a hysteresis comparator coupled to said mode selection means for comparing a third signal to a fourth signal;

a window comparator coupled to said mode selection means for comparing said third signal to said fourth signal.

5. The disk drive read channel of claim 4 wherein said data register is selectively coupled to and controls a first digital to analog converter, said first digital to analog converter setting a hysteresis value of said hysteresis comparator, said first digital to analog converter further setting a comparison level of said window comparator.

6. The disk drive read channel of claim 5 wherein said servo register is selectively coupled to and controls said first digital to analog converter.

7. The disk drive read channel of claim 5 wherein a second data register is selectively coupled to and controls a second digital to analog converter, said second digital to analog converter setting a cut-off frequency of a programmable filter.

8. The disk drive read channel of claim 5 wherein a second servo register is selectively coupled to and controls a second digital to analog converter, said second digital to analog converter setting a cut-off frequency of a programmable filter.

9. The disk drive read channel of claim 4 wherein said servo register is selectively coupled to and controls a first digital to analog converter, said first digital to analog converter setting a hysteresis value of said hysteresis comparator, said first digital to analog converter further setting a comparison level of said window comparator.

10. A method for switching between a data mode and a servo mode in a disk drive comprising the steps of:

reading recorded signals from a disk;

sensing a transition from stored data to servo data;

generating a servo gate signal;

selecting a data resistor if said servo gate signal is in a first state, and selecting a servo resistor if said servo gate signal is in a second state.

11. The method of claim 10 further comprising the steps of:

setting a hysteresis comparator to a first hysteresis value when said data resistor is selected;

setting said hysteresis comparator to a second hysteresis value when said servo resistor is selected.

12. The method of claim 10 further comprising the steps of:

setting a window comparator to a first comparison level when said data resistor is selected;

setting said window comparator to a second comparison level when said servo resistor is selected.

* * * * *